United States Patent
Chiu

(10) Patent No.: US 6,686,546 B2
(45) Date of Patent: *Feb. 3, 2004

(54) STATIC CHARGE DISSIPATION FOR AN ACTIVE CIRCUIT SURFACE

(75) Inventor: Anthony M. Chiu, Richardson, TX (US)

(73) Assignee: STMicroelectronics, Inc., Carrollton, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

(21) Appl. No.: 09/224,812

(22) Filed: Dec. 30, 1998

(65) Prior Publication Data

US 2002/0067344 A1 Jun. 6, 2002

(51) Int. Cl.[7] ................................................. G09G 5/00
(52) U.S. Cl. ........................ 178/18.01; 178/18.04; 178/18.06; 345/173; 345/174; 345/177; 361/220; 361/212
(58) Field of Search ................ 178/18.01, 18.06, 178/180.04; 345/173, 171, 174; 361/212, 220

(56) References Cited

U.S. PATENT DOCUMENTS

| | | | |
|---|---|---|---|
| 3,921,167 A | 11/1975 | Fox | 340/365 C |
| 3,974,332 A | 8/1976 | Abe et al. | 178/18 |
| 4,194,083 A | 3/1980 | Abe et al. | 178/18 |
| 4,290,052 A | 9/1981 | Eichelberger et al. | 340/365 C |
| 4,353,056 A | 10/1982 | Tsikos | 340/146 |
| 4,394,773 A * | 7/1983 | Ruell | 382/4 |
| 4,728,174 A * | 3/1988 | Grinberg et al. | 350/334 |
| 4,766,474 A | 8/1988 | Nakagawa et al. | 357/23.8 |
| 5,222,013 A * | 6/1993 | Schwalm | 361/212 |

(List continued on next page.)

FOREIGN PATENT DOCUMENTS

| | | | |
|---|---|---|---|
| EP | 0 790 479 A1 | 8/1997 | G01B/7/00 |
| JP | 404/025200 A | 1/1993 | H05K/7/14 |
| WO | WO 94/05042 | 3/1994 | H01L/27/02 |
| WO | WO 98/52147 | 11/1998 | G06K/9/20 |

OTHER PUBLICATIONS

Marco Tartagni and Roberto Guerrieri, *A Fingerprint Sensor Based on the Feedback Capacitive Sensing Scheme*, IEEE Journal of Solid State Circuits, vol. 33, No. 1, Jan. 1998, pp. 133–142.

Tartagni, et al., "A 390 dpi Live Fingerprint Imager Based on Feedback Capacitive Sensing Scheme", 1997 IEEE International Solid-State Circuits Conference, 1997.

R.F. Wolffenbuttel and P.O.L. Regtien, "Integrated Tactile imager with an Intrinsic Contour Detection Option", *Sensor and Actuators*, Jan./Feb. 1989, No. ½, pp. 141–153.

N.D. Young, et al., "Novel Fingerprint Scanning Arrays Using Polysilicon TFT's of Glass and Polymer Substrates", IEEE Electron Device Letters, v. 18, No. 1, Jan. 1997, pp. 19–20

"Physics of Semiconductor Devices", by S.M. Sze, John Wiley & Sons, Inc., 1981, pp. 30–33.

*Primary Examiner*—Richard Hjerpe
*Assistant Examiner*—Abbas Abdulselam
(74) *Attorney, Agent, or Firm*—Lisa K. Jorgenson; William A. Munck

(57) ABSTRACT

A structure and method is disclosed for dissipating electrostatic charges comprising an insulating layer between and over a plurality of conductive plates, wherein the insulating layer isolates the conductive plates and protects the conductive plates from damage, and wherein the insulating layer comprises a conductive discharge grid adjacent the conductive plates.

28 Claims, 4 Drawing Sheets

U.S. PATENT DOCUMENTS

| | | | | |
|---|---|---|---|---|
| 5,325,442 A | | 6/1994 | Knapp | 382/4 |
| 5,331,580 A | | 7/1994 | Miller et al. | 364/708.1 |
| 5,463,388 A | * | 10/1995 | Boie et al. | 345/174 |
| 5,514,612 A | | 5/1996 | Rao et al. | 437/51 |
| 5,648,642 A | * | 7/1997 | Miller et al. | 178/18 |
| 5,778,089 A | | 7/1998 | Borza | 382/124 |
| 5,847,690 A | * | 12/1998 | Boie et al. | 345/174 |
| 5,862,248 A | | 1/1999 | Salatino et al. | 382/124 |
| 5,877,933 A | * | 3/1999 | Johansen | 361/220 |
| 5,907,627 A | | 5/1999 | Borza | 382/124 |
| 5,999,386 A | * | 12/1999 | Anderson et al. | 361/56 |
| 6,008,081 A | * | 12/1999 | Wu | 438/210 |
| 6,064,340 A | * | 5/2000 | Croft et al. | 342/460 |
| 6,091,082 A | | 7/2000 | Thomas et al. | 357/77 |
| 6,114,862 A | * | 9/2000 | Tartagni et al. | 324/662 |
| 6,163,313 A | * | 12/2000 | Aroyan et al. | 345/173 |
| 6,172,496 B1 | * | 1/2001 | Karins et al. | 324/96 |
| 6,180,989 B1 | * | 1/2001 | Bryant et al. | 257/414 |

* cited by examiner

STATIC CHARGE DISSIPATION FOR AN ACTIVE CIRCUIT SURFACE

CROSS REFERENCE TO A RELATED APPLICATION

The following related patent applications, each showing a type of electrostatic discharge protection method and apparatus, are incorporated herein by reference and with which the present invention finds utility: U.S. patent application Ser. No. 08/927,450, STMicroelectronics Docket No. 97-B-037, filed Sep. 11, 1997 and titled ELECTROSTATIC DISCHARGE PROTECTION OF A CAPACITIVE TYPE FINGERPRINT SENSING ARRAY; U.S. Pat. No. 6,180,989 titled SELECTIVELY DOPED ELECTROSTATIC DISCHARGE LAYER FOR AN INTEGRATED CIRCUIT SENSOR; U.S. patent application Ser. No. 09/223,706, filed Dec. 30, 1998, and titled STATIC CHARGE DISSIPATION PADS FOR SENSORS; U.S. patent application Ser. No. 09/223,346, filed Dec. 30, 1998, and titled APPARATUS AND METHOD FOR CONTACTING A SENSOR CONDUCTIVE LAYER; U.S. patent application Ser. No. 09/224,815, filed Dec. 30, 1998, and titled APPARATUS AND METHOD FOR CONTACTING A CONDUCTIVE LAYER; U.S. patent application Ser. No. 09/223,707, filed Dec. 30, 1998, and titled TOPOGRAPHICAL ELECTROSTATIC PROTECTION GRID FOR SENSORS; and U.S. patent application Ser. No. 09/223,629, filed Dec. 30, 1998, and titled ELECTROSTATIC DISCHARGE PROTECTION FOR SENSORS.

TECHNICAL FIELD OF THE INVENTION

The present invention relates in general to the field of static discharge dissipation, and more particularly, to a structure and method for protecting active circuits on sensor surfaces from the environment of intended use.

BACKGROUND

Without limiting the scope of the invention, its background is described in connection with the protection of integrated circuit fingerprint sensors from the environment during regular use, as an example.

Heretofore, in this field, the detection of fingerprint patterns, composed of lines or ridges and valleys, has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technologies that acquire a fingerprint image. In those systems, generally, the mechanical and optical sensors obtain a fingerprint image using a scanner or a camera, process the acquired information into an analog or digital signal that can be analyzed, and provide an output based on the acquired signal. Unfortunately, the lighting and contrast conditions available at the time the image is acquired affects the analysis of the acquired data and consequently affects the sensor output. Furthermore, image capture systems are easily tricked using false images. In addition, conventional optical sensors usually require bulky optics, making these types of sensors impractical for portable systems.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. The sensing member contains a multitude of capacitors that sense the patterns of the fingerprint when the finger is pressed against the sensing surface. The information obtained by the sensing member is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,385,831 issued to Ruell, et al., discloses a fingerprint sensor that provides an electrical output signal in response to the topography of the fingerprint. The sensor incorporates a contact body that is formed, at least in part, by a light transparent elastic material. The elastic contact material may be attached to a flat sensor plate that has a light receiving surface. The sensor also incorporates a light source and a photodetector to measure the valleys and ridges of the fingerprint. The elastic nature of the contact body causes cycles of compression and flexing that again lead to the deterioration of the contact point between the sensor and the finger.

It has also been found that the current methods and structures for protecting sensors from the environment of intended use fail to address the distinct environmental exposures to which the sensors are exposed, in particular, electrostatic build-up on, e.g., human skin or any other object that may come into close proximity with or contact the sensor. Sensor protection versus sensitivity must generally be carefully balanced to achieve both an acceptable signal-to-noise ratio and adequate protection. Generally, as sensor protection increases, sensor sensitivity decreases. In the case of electrical damage to sensor surface structures or the active circuits that form part of the sensor circuitry during use, present electrostatic discharge circuitry fails to protect the sensor circuitry during an electrostatic discharge.

As sensors and users can be exposed to a wide variety of environmental conditions that can cause a great increase in electrical potential in comparison to objects that are at a different potential or grounded, it has now been found that sensors should be fitted with electrostatic discharge protection to be durable. For example, when the user approaches the sensor at a great voltage disparity, a sudden electrical discharge may cause operational failure of the sensor, such failure may be temporary or permanent.

Typical electrostatic discharge protection circuits for solid state arrays may be relatively poor, since in this type of circuit configuration, it is usual to connect the cell's buried and ungrounded capacitor plates to transistor gates and/or to connect the cell's ungrounded and buried capacitor plates to system ground potential by way of reverse biased diodes. In this type of construction and arrangement, the electrostatic charge sometimes carried by a human body and its fingertip, which may be in the range of several kilo volts (kV) or more, may be sufficiently high to break through the solid state cell's upper dielectric/passivation layer. If this breakthrough occurs, the potential is raised at ungrounded circuit nodes that are associated with the buried capacitor plates and may cause damage to the associated array cell. Damage to the data or the sensor must be avoided, while the sensitivity of the sensor is maintained at close to optimal levels.

Another significant problem of the current structures for the protection of fingerprint sensors is contamination from substances, such as oils and proteins that are found on the surface of fingers. To remove these contaminants, it is often necessary to use organic or inorganic solvents or detergents to clean the sensor surface. Therefore, the electrostatic discharge protection must be resistant to these often corrosive compounds.

Another area of concern is hygiene. Fingers, as well as the environment, tend to contain a number of microbes and bacteria that are removed from the sensor along with the other contaminants. To remove these microbes and bacteria and reduce the chance of contagion between users, antibacterial, antifungal and decontaminating agents are often used to clean the sensors. These decontaminating agents often include harsh abrasives, enzymes, organic or inorganic solvents or detergents. Therefore, any electrostatic discharge protection must be resistant to these often corrosive cleaning compounds.

What is needed is a structure and method to protect sensors from electrostatic discharges, while at the same time maintaining the sensors ability to withstand mechanical stress. The structure must not only permit continued functioning of the sensor during normal use, but also withstand, among others, the extreme conditions of humidity, electricity, heat, light, etc., to which the sensor may be exposed. The sensor electrostatic discharge structure should also be resistant to chemical detergents and solvents, but still be compatible with the underlying components of the sensor.

SUMMARY OF THE INVENTION

The present invention provides a method of and system for providing electrostatic discharge capability for a sensor circuit, such as a fingerprint sensor. In a type of sensor array with which this invention finds utility, each sensing cell includes ungrounded metal capacitor plates covered by a dielectric. An ungrounded object, such as a fingertip which comes close to or in contact with the dielectric forms a third capacitor plate between the metal capacitor plates. An electrostatic charge sometimes carried by a human body may be sufficiently high to break through the dielectric layer covering the metal capacitor plates. The present invention improves the electrostatic discharge performance of such a sensor array.

The present invention is directed to a process and apparatus for dissipating electrostatic charges including, an insulating layer between and over a plurality of conductive plates, wherein the insulating layer isolates the conductive plates and protects the conductive plates from damage. The insulating layer also includes a conductive discharge grid over and adjacent the conductive plates.

Another embodiment of the invention is a discharge grid ground for a sensor including a discharge grid that is integral with an insulating layer and that is disposed on a different plane from and adjacent the sensor circuitry, wherein the discharge grid diffuses electrostatic charges that are caused when an object approaches the insulating layer and is connected to a ground separate from the fingerprint sensor ground.

Another embodiment of the present invention is an electrical discharge grid for protecting an active component of a sensor chip including, a sensor, an insulating layer on the sensor, the insulating layer electrically isolating the sensor from subsequent layers, a first row of substantially parallel electrically conductive lines on the insulating layer, and a second row of substantially parallel electrically conductive lines disposed on the insulating layer and substantially perpendicular to the first row of conductive lines, wherein the first and second rows of conductive lines are connected to ground.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of ways to make and use the invention and do not delimit the scope of the invention.

Figure 1:
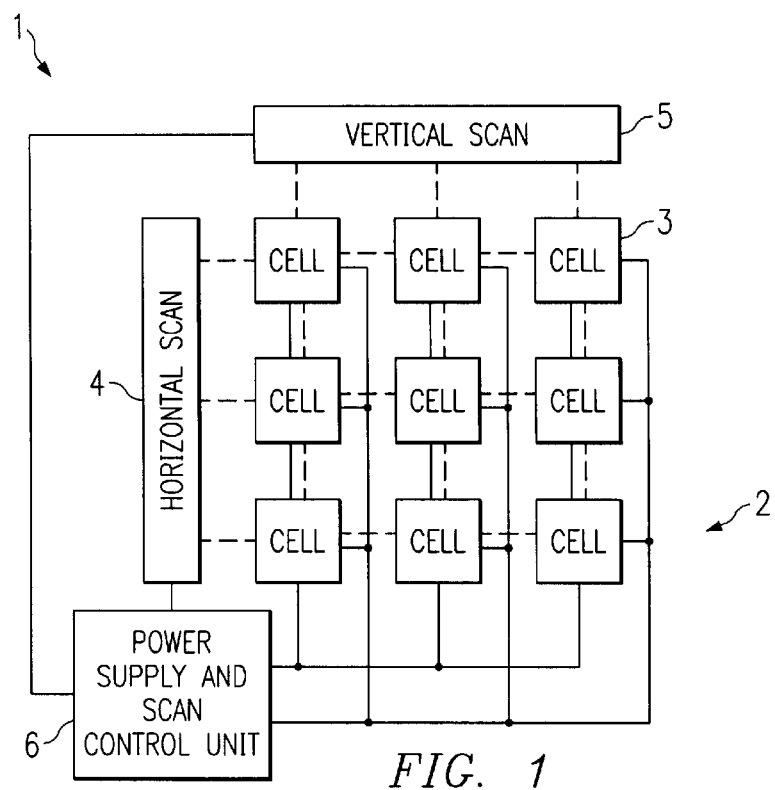
FIG. 1 is a block diagram of a sensor array according to the present invention.

By way of background, referring now to FIG. 1, there is shown a block diagram of a user input device 1. User input device 1 is preferably integrated into a single chip, and it includes an array 2 of sensors or pixel cells 3. For purposes of illustration, array 2 is shown comprising nine cells 3. In an actual device, more than nine cells would more likely be included. Each individual sensing cell 3 represents one pixel of the array 2 and is generally smaller than the width of a fingerprint ridge. Enough cells 3 are included in array 2 so that several ridges and valleys of a fingerprint may be detected. In a preferred embodiment, pixel cells 3 are on a pitch of approximately 50 $\mu$m, which corresponds to a resolution of approximately 508 dots per inch (dpi) for a fingerprint image.

Device 1 includes a horizontal scanning stage 4 and a vertical scanning stage 5. Scanning stages 4 and 5 enable detection from one cell in array 2 at a time according to a predetermined scanning pattern.

Input sensor device 1 includes a power supply and scan control unit 6. Power supply and scan control unit 6 supplies a reference voltage to each cell 3 of array 2. Power supply and scan control unit 6 also operates to scan stages 4 and 5 to produce the desired scanning of cells 3.

Figure 2:
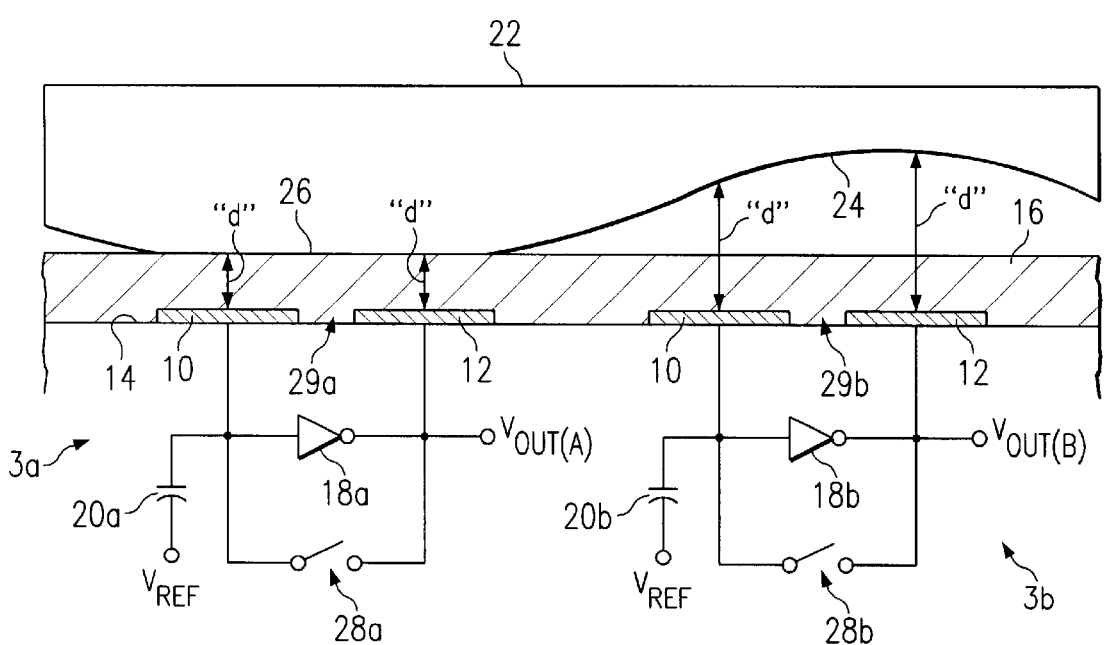
FIG. 2 illustrates the physical structure of the individual sensor cells and their electrical operation according to the present invention.

By way of further background, referring now to FIG. 2, there is illustrated the structure and operation of a cell 3. The preferred cell of the present invention is of the type disclosed in Tartagni, U.S. patent application Ser. No. 08/799,543, filed Feb. 13, 1997, titled CAPACITIVE DISTANCE SENSOR, the disclosure of which is incorporated herein by reference. The technology of the present invention uses an active pixel design based on a capacitive feedback sensing circuit.

Each cell 3 (3a, 3b) includes a first conductor plate 10 and a second conductor plate 12 supported on a semiconductor substrate (shown below with reference to FIG. 3), which is preferably a conventional silicon substrate that may have a shallow epitaxial layer at an upper surface region 14 of the silicon substrate. The top surface of the substrate includes an insulating layer 16. Insulating layer 16 is preferably an oxide layer, which may be a conventional thermally deposited silicon dioxide layer. Insulating layer 16 may further comprise a protective or passivation coating preferably of a hard or ultra-hard material. With an added protective coating, insulating layer 16 protects sensor 3 from abrasion, contamination, and electrostatic discharge.

Each cell 3 includes a high-gain inverting amplifier 18 (18a, 18b). The input of amplifier 18 is connected to a reference voltage source $V_{REF}$ through an input capacitor 20 (20a, 20b). The output of each amplifier 18 is connected to an output $V_{OUT}$ ($V_{OUT(A)}$, $V_{OUT(B)}$) The input of each amplifier 18 is also connected to the respective conductor plate 10 and the output of each amplifier 18 is also connected to the respective conductor plate 12, thereby creating a charge integrator whose feedback capacitance is the effective capacitance between the two conductor plates 10 and 12.

When no object is placed on the surface of insulating layer 16, the effective capacitance between plates 10 and 12 is the fringing capacitance seen through layer 16 and the air near the surface of the sensor at region 29 (29a, 29b). The distance between plates 10 and 12 at region 29 is approximately 2 microns. When an object 22, such as a finger, is placed on the surface of insulating layer 16, the conductive properties of the object (e.g., skin surface) and the proximity of the object to the sensor surface will act to modify the capacitive coupling between plates 10 and 12. The object is separated from plates 10 and 12 by a total dielectric layer that includes both the insulating layer 16 and a variable thickness of air between layer 16 and the object. Because fingerprint valleys or pores 24 will be farther from the sensor surface than finger ridges 26, sensors 3 beneath valleys or pores 24 will have more distance between their conductor plates 10 and 12 and the skin surface than sensors 3 under ridges 26. The thickness "d" of this total dielectric layer will modulate the capacitive coupling between plates 10 and 12 of each cell 3. Accordingly, sensors 3 under valleys or pores 24 will exhibit a different effective capacitance than sensors 3 under ridges 26. As shown in FIG. 2, the effective capacitance of sensor 3a is different from the effective capacitance of sensor 3b. $V_{OUT(A)}$ will differ from $V_{OUT(B)}$ since $V_{OUT}$ is inversely proportional to the effective feedback capacitance.

Scanning stages 4 and 5 of FIG. 1 now operate to sequentially enable the reading or interrogation of the many cells 3 within array 2. Sensors 3 work in two phases. During the first phase, the amplifier 18 is reset with a switch 28 (28a, 28b) by shorting the input and output of amplifier 18. This causes amplifier 18 to settle at its logical threshold. During the second phase, a fixed charge is input to the amplifier, causing an output voltage swing inversely proportional to the feedback capacitance, which is the effective capacitance between conductor plates 10 and 12. This effective feedback capacitance is now the capacitance between plates 10 and 12 seen across the total dielectric at a distance "d" which includes layer 16 and air between the finger 22 and the top of layer 16.

For a fixed amount of input charge, the output of amplifier 18 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 3a under ridge 26 will be different from the output of sensor 3b under valley 24. The entire fingerprint pattern can thus be digitized by sensing the differences in adjacent pixel cell capacitive values. It is also important to note that a conductive path to ground should be provided to or around each pixel (not shown), such that an electrostatic discharge is dissipated though the conductive path to ground rather than through the circuitry of the pixel and to ground. To be effective, such electrostatic discharge layer must present a more conductive path to ground than any paths to ground through the internal circuitry of the pixels and any dielectrics insulating the circuitry from the environment.

The structure and method of the present invention may be used with a wide variety of imaging sensors, such as the fingerprint sensor described herein by way of example, and as will be known to those skilled in the art in light of the present disclosure.

As noted above, in using the described capacitance-coupled sensor, resolutions of up to 508 dpi can be achieved. With improvements in image processing algorithms, sensors having a resolution of 750 dpi, or more, can be expected. For use in sensing fingerprint valleys and ridges, an array 2 of sensors 3 is used to sample the fingerprint pattern. The entire chip may also contain additional timing and voltage controls and references in addition to the above described controls and references.

The structure and method for dissipating the electrostatic discharge and protecting the pixel cell 3 will now be described. Electrostatic discharge protection relative to electrostatic potential that may be carried by an object such as an ungrounded fingertip, is provided by placing a number of conductive paths within the insulating layer 16.

Figure 3:
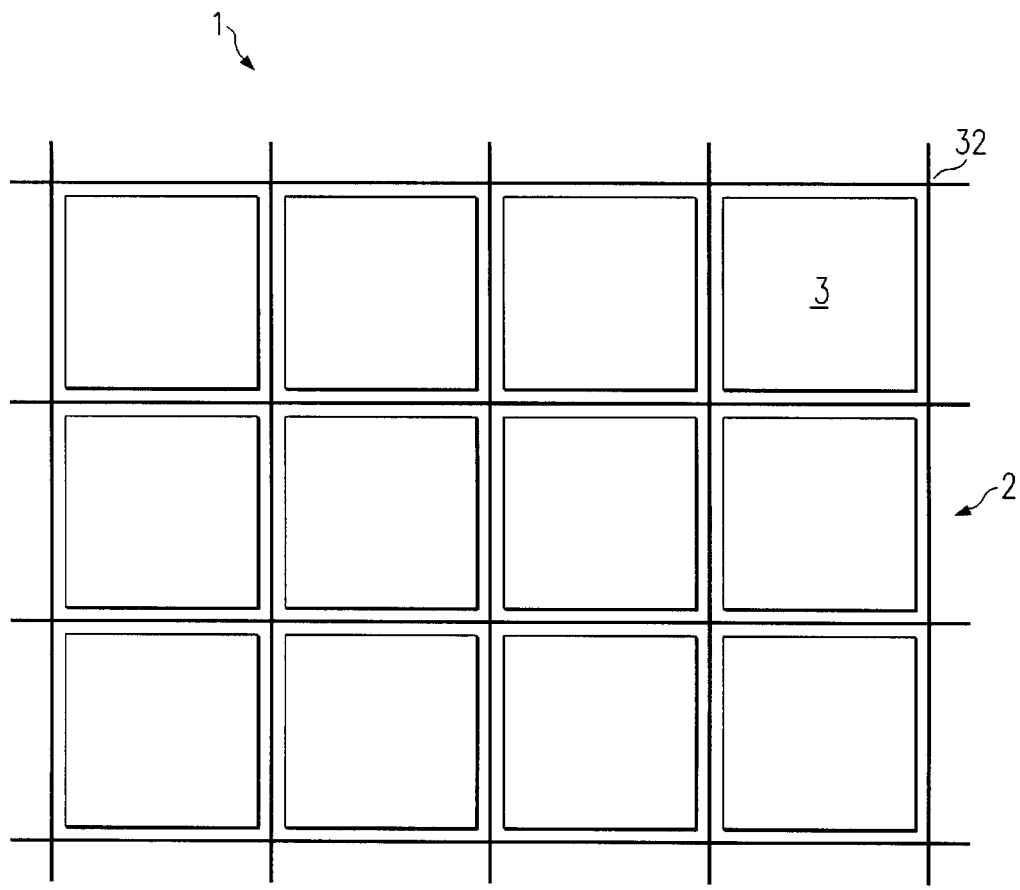
FIG. 3 is top view of one embodiment of a basic discharge grid structure for electrostatic discharge protection according to the present invention.

FIG. 3 is a top view of a portion of a user input device 1 having an array 2 of sensor or pixel cells 3. A discharge grid 32 is depicted surrounding and adjacent to each individual cell 3. As will be apparent to those of skill in the art the discharge grid 32 does not have to entirely surround each cell 3, nor does the grid 32 have to be adjacent each of the cells 2 of the array 2 but may be disposed directly over the cells 3 themselves. In one preferred embodiment, however, and as will be appreciated in light of the disclosure herein, that ease of fabrication may favor the formation of an electrostatic discharge grid 32. Also, an increased sensitivity may be attained by placing the gridlines adjacent rather than over the cells 3.

Figure 4:
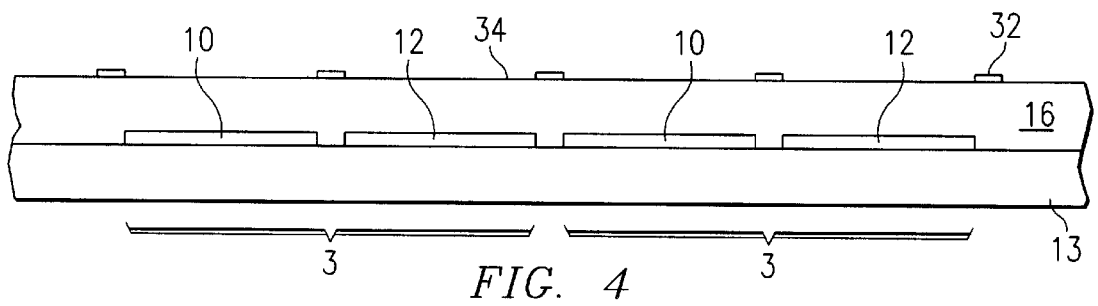
FIG. 4 is a cross-section of a discharge grid for electrostatic discharge protection according to the present invention.

FIG. 4 is a cross-sectional view of a discharge grid 32 of the present invention. Each pixel cell 3, such as a capacitively coupled fingerprint sensor, is formed on a silicon substrate 13. Substrate 13 may have P-type or N-type conductivity. Substrate 13 may alternatively be made of, for example, silicon, glass, gallium arsenide, silicon on insulator (SOI) structures, epitaxial formations, germanium, germanium silicon, polysilicon, amorphous silicon, or like semiconductive or conductive substrates. Substrate 13 is typically made of single crystal silicon, and may be lightly doped with boron, phosphorous or arsenic atoms depending upon the desired conductivity. The metal plates 10 and 12 that serve to form the capacitance of the active circuit of the sensor 10 are depicted below insulating layer 16. The insulating layer 16 may serve as both an electrical and environmental insulating layer 16. Disposed on the surface 34 of the insulating layer 16 is a discharge grid 32, shown here as a cross-section of the gridlines that form the discharge grid 32.

Figure 5:
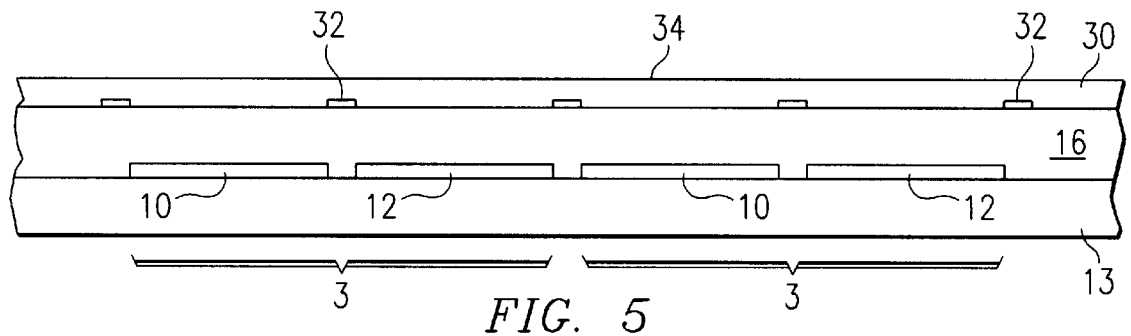
FIG. 5 is a cross-section of yet another embodiment of a basic structure for electrostatic discharge protection according to the present invention.

FIG. 5 is a cross-sectional view of a structure for dissipating the electrostatic discharge and protecting a pixel cell 3. An insulating or dielectric layer 16 is disposed over and between the plates 10 and 12 and the generally symmetric discharge grid 32, which is disposed on a different plane from and adjacent the cell 3. Referring to FIG. 2, the plates 10 and 12 are in generally the same plane, while the discharge grid 32 is on a different plane, generally closer to the user than the underlying electronic circuitry. The discharge grid 32 may be conductive or semi-electrical conductive depending on the level and extent of electrostatic discharge to which a sensor 3 or a sensor array system may be exposed. The discharge grid 32 will provide a more conductive path to ground than the internal circuitry of the pixels or any dielectric disposed therebetween. A passivation layer 30 is deposited over the dielectric layer 16.

The conductivity of the discharge grid 32, however, must also be sufficient to transfer electrostatic discharges created at the surface of the sensor cell 3 at discharge grid 32 and the insulating layer 16 (referring to FIG. 2), to protect the electronic components of the sensor cell 3. Generally uncovered in this configuration is the sensor 3. The conductive paths that form the discharge grid 32 depicted, may be formed on, or integral with, the insulating layer 16 (see FIGS. 2, 4 and 5). The conductive paths of the discharge grid 32 may be formed independently or at the same time.

The insulating layer 16 may be a dielectric layer formed over conductor plates 10 and 12 and substrate 13, preferably by deposition techniques using plasma enhanced chemical vapor deposition (PECVD) to a thickness that will electrically isolate subsequent layers from conductor plates 10 and 12 and substrate 13. The dielectric layer may be formed of any suitable dielectric material and thickness that ensures electrical isolation, for example, silicon dioxide or glass. The glass may contain, e.g., phosphorous or boron and phosphorous, which may serve to trap sodium ions from objects, such as the skin. The thickness of dielectric layer may be varied, for example, by changing the time of deposition. The dielectric may preferably be between about 6,000 and 12,000 angstroms. Alternatively, dielectric layer may be a composite layer having a first and second dielectric layers formed of compatible dielectric materials with desired dielectric constants. If a composite dielectric layer is formed one layer is preferably silicon dioxide or glass and the other layer is preferably silicon nitride. Each of these layers may have a thickness between approximately 3,000 and 6,000 angstroms.

A passivation layer 30 may be formed, if desired, over or adjacent to conductive paths of the discharge grid 32 and over exposed insulating 16, and may also be deposited by, e.g., PECVD. The overlying passivation layer 30 may be, e.g., a hard material suitable for protecting the sensor, such as silicon carbide or a combination of silicon carbide and silicon nitride. This overlying passivation layer 30, if formed, should be thick enough to protect the sensor from abrasion and contamination yet thin enough to allow the discharge grid 32 to transfer the electrostatic discharge created at the surface of layer 16 away from the active circuits of cells 3 of array 2. In a preferred embodiment, the passivation layer is between approximately 2,000 and 3,000 angstroms.

The discharge grid 32 may be further coupled to a charge dissipation circuit (not shown), providing a conductive path to ground that is more conductive than any path to ground through the internal circuitry of the pixels and any dielectrics insulating the circuitry from the environment. While the insulating layer 16 may be a conformal layer, it may also be etched back to form a substantially planar layer as shown in FIG. 2, or may be formed from a material that is planar when formed, such as a spin-on-glass.

The discharge grid 32 may also provides durability to the underlying sensor, and more particularly, to the entire insulating layer 16. The thickness, composition and location of discharge grid 32 may be varied to optimize its ability to carry the electrostatic discharge away from sensor 3 while minimizing the effect on the sensitivity of sensor 3 caused by placing discharge grid 32 between the capacitance source, e.g., a finger, and the conductor plates 10 and 12.

The thickness of the discharge grid 32 may be between approximately 500 and 15,000 angstroms depending upon the desired material. The gridlines of the discharge grid 32 may have a width of between 0.5 and 5 micrometers. The thickness of the discharge grid 32 may also be increased or decreased depending on, e.g., the desired ratio of the dielectric material to conductive material in insulating layer 16, desired resistivity levels, shape and size of the insulating layer 16, and the like. The composition of discharge grid 32 may be formed from any suitable material for charge carrying capacity and for additional damage protection. For example, aluminum or an aluminum alloy may be formed to a thickness between approximately 5,000 and 15,000 angstroms having a resistivity of approximately 0.04 ohms per square. Alternatively, a titanium layer may be formed to a thickness between approximately 500 and 1,000 angstroms with a resistivity of approximately 10 ohms per square. Alternatively, a tungsten layer may be formed to a thickness of between approximately 4,000 and 8,000 angstroms having a resistivity of approximately 0.14 ohms per square.

The conductive material chosen for the discharge grid 32 should have a sheet resistance low enough to allow the electrostatic charge to dissipate through this layer to prevent the electrostatic charge from reaching conductor plates 10 and 12. The materials used for the discharge grid 32 should be chosen to minimize adhesion problems between the layers, which could detrimentally affect the underlying sensor performance.

The discharge grid 32 may be deposited using the same equipment that is presently used to create the insulating layer 16 for use with, e.g., a fingerprint sensor. Thus, the present invention presents additional advantages in cost and efficiency in manufacturing. By using the current PECVD equipment, the entire layer 16 may be deposited at relatively low temperatures, e.g., 300 degrees Celsius or less.

In one embodiment for forming discharge grid 32, by way of example, a titanium layer is initially blanket deposited followed by forming titanium nitride over the titanium. Next, tungsten is formed over the titanium nitride to form a composite discharge grid 32. The gridlines of the discharge grid 32 may have a width of between 0.5 and 5 micrometers and a thickness of between 500 and 15,000 angstroms.

The surface 34 of sensor 3 is away from the active circuits of sensor 3, and may have disposed directly thereon the discharge grid 32. The discharge grid 32 can dissipate a discharge (not depicted) caused by the proximity of an electrically charged object close to the sensor surface. The proximity of the object and the level of potential difference between the object and the discharge grid 32 determine whether an electrical discharge occurs. The voltage differential between the discharge grid 32, and consequently the current that is generated during a discharge, will depend on the resistivity of the components, as is known to those of ordinary skill in the art. A discharge grid 32 with low resistivity will generally be used.

The discharge grid 32 is positioned in the spaces between conductive plates 10, 12 for individual sensors 3 in order to maximize the proximity of the discharge grid 32 to individual sensors 3 without greatly affecting sensor sensitivity. At the same time, positioning the discharge grid 32 at the edges of the sensors 3 allows for the maximization of the surface area of the individual sensors 3 through which a capacitance can be formed and measured. The discharge grid 32, therefore, is designed to maximize discharge potential while concurrently decreasing the effect that the discharge grid 32 may have on sensor sensitivity. The discharge grid 32 will generally be patterned to outline the sensors 3. In the example depicted, the discharge grid 32 includes two sets of parallel lines that are generally perpendicular to each other. The surface area and the shape of the opening of the discharge grid 32 at the sensors 3 may be varied depending on the shape of the underlying conductive plates 10, 12 for sensor 3.

As depicted in FIG. 5, the discharge grid 32 is shown below the surface 34 of the insulating layer 16. Also, a passivation layer 30 is depicted between the insulating layer 16 and the discharge grid 32. As will be apparent to those of ordinary skill in the art in light of the present disclosure, the discharge grid 32 can be positioned below, above or integral with the insulating layer 16 or the passivation layer 30. Else, portions of the discharge grid 32 may alternate above and below the surface 34 of the insulating layer 16 in the same sensor array 2, or gradually change in depth, e.g., following the outline of a finger.

The discharge grid 32 may also provide durability to the sensor 3, and more particularly, the insulating layer 16. The thickness and composition of the discharge grid 32 may be varied to minimize the effect on the sensitivity of the sensor caused be placing the discharge grid 32 between the capacitance source, e.g., a finger, and the sensor 3 circuitry.

Figure 6:
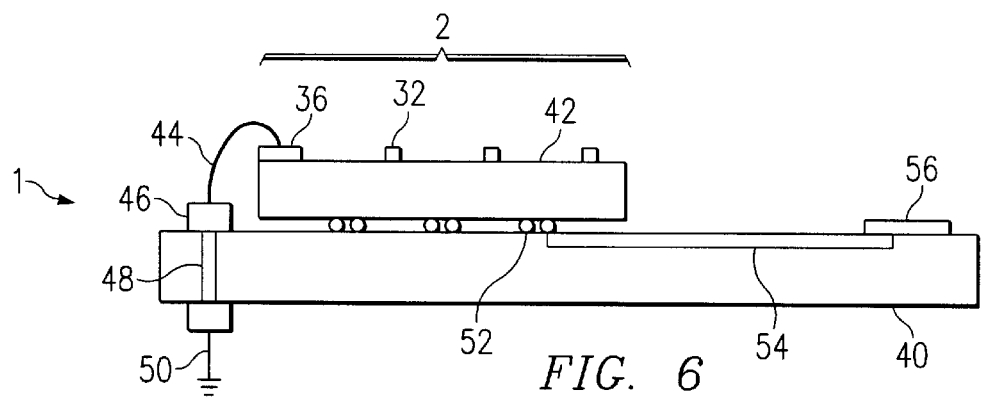
FIG. 6 is a cross-section of a discharge grid ground for electrostatic discharge protection according to the present invention.

FIG. 6 shows another embodiment of the present invention in which the discharge grid 32 is grounded to a separate ground from the active circuits of the sensor array 2. A printed circuit board 40 holds a sensor chip 42. The sensor chip 42 is depicted with the discharge grid 32 connected using, e.g., wire bonding 44 from a pad 36 on the sensor chip 42 to a grounding pad 46 on the printed circuit board 40 to provide an off-chip ground. The off-chip ground is connected to a ground that is different from the ground used by the sensor circuitry to dissipate charges. The discharge grid 32 is connected to an off-chip ground terminal, depicted here as grounding pad 46. The grounding pad 46 is connected to the off-chip ground through, e.g., a via 48 to a ground 50, which can be the ground 50 of the power source of the entire sensor detection system. While wire bonding 44 is depicted, other forms of electrical connection may be used such as conductive epoxies or polymers.

The use of wire bonding 44, however, may be useful to prevent grounding of the discharge grid 32 through the sensor chip 42. Alternatively, the ground 50 may be a completely separate ground from any of the ground connections of the sensor circuitry and power supply. The active components of the sensor chip 42 may be connected to the printed circuit board 40 by, e.g., ball or solder bonds 52 through a conduit 54 to a pad 56. By using a separate ground 50, the present invention avoids overwhelming the charge dissipation circuits that form part of the active circuits of the sensors 3 and of sensor chip 42.

Figure 7:
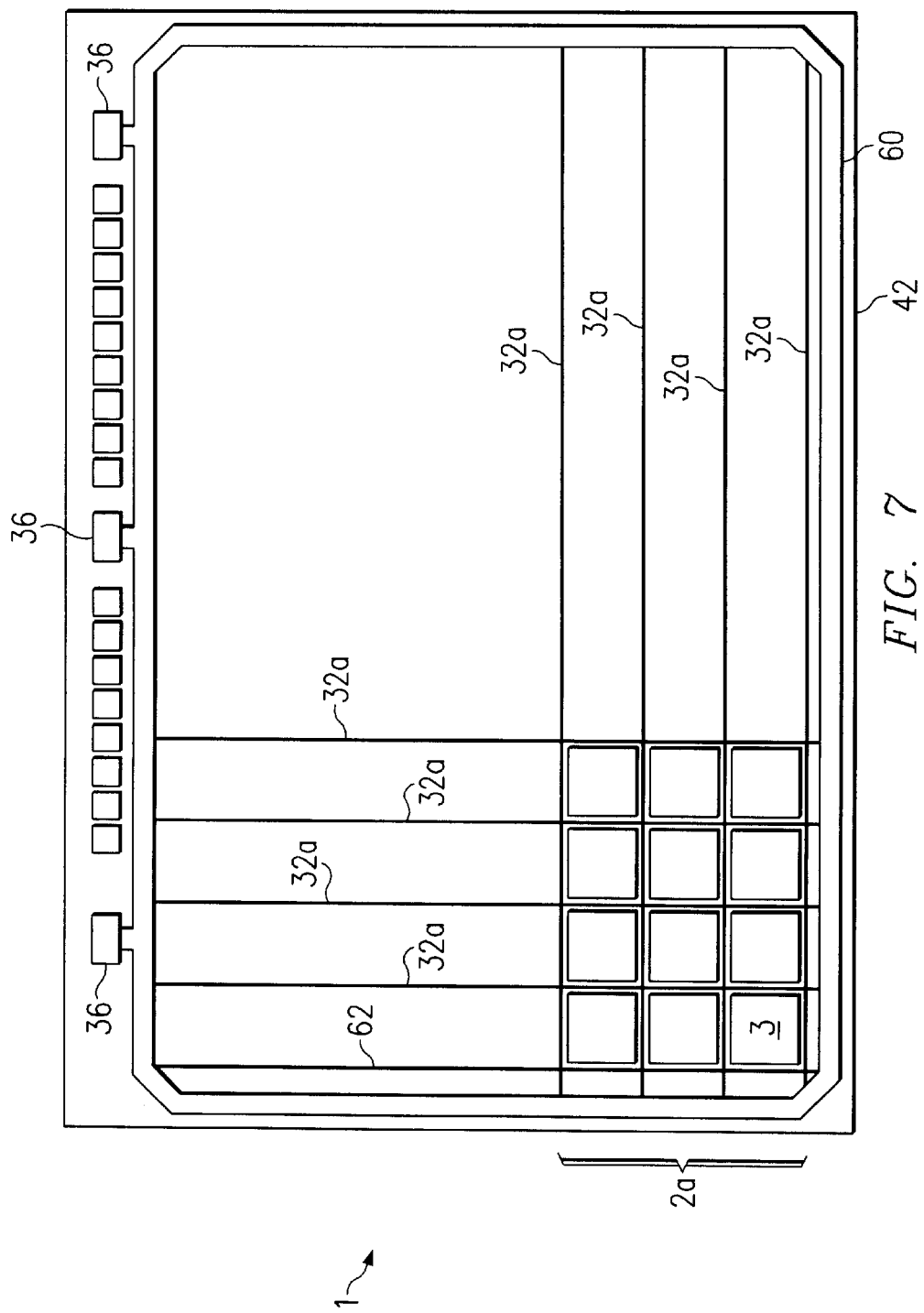
FIG. 7 is a top view of a partial sensor array of one embodiment of an electrostatic discharge protection and grounding structure according to the present invention.

FIG. 7 shows a top view of a user input device 1 in which a partial array 2a of sensor cells 3 have been formed. A partial electrostatic discharge grid 32a is depicted where the individual gridlines 62 are shown traversing the length and width of the sensor chip 42. The gridlines 62 of the discharge grid 32 terminate at a bus 60 that can be placed over or integral with the insulating layer. The gridlines 62 may have a width of between 0.5 and 5 micrometers. The bus 60 itself terminates at grounding pad 36 that may be used to electrically connect the discharge grid 32 to a ground separate from the ground for the sensor circuitry. By connecting the electrostatic discharge grid 32 to a separate ground, the sensor circuitry may be better protected from an electrostatic discharge.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of forming an electrostatic discharge device comprising the steps of:

forming a composite protective layer including an insulating layer between and over a plurality of conductive plates within an array of capacitive sensor pixels operable to sense surface features on an object proximate to the conductive plates, wherein the protective layer isolates the conductive plates and protects the conductive plates from damage, and wherein the protective layer comprises a conductive grid including lines extending along logical boundaries between adjoining capacitive sensor pixels and separated by open regions in the conductive grid over at least portions of the conductive plates.

2. The method of claim 1, further comprising the step of:

forming a passivation layer over the insulating layer, wherein the passivation layer further protects the conductive plates from damage.

3. A method of forming an electrostatic discharge device comprising the steps of:

forming a dielectric layer over a plurality of conductive plates within an array of capacitive sensor pixels operable to sense surface features on an object proximate to the conductive plates, the dielectric layer isolating the conductive plates; and forming a conductive grid disposed over at least a portion of the dielectric layer and including lines extending along logical boundaries between adjoining capacitive sensor pixels and separated by open regions in the conductive grid over at least portions of the conductive plates, wherein the conductive grid dissipates an electrostatic charge and prevents the electrostatic charge from reaching the plurality of conductive plates.

4. The method of claim 3, wherein the conductive grid has a sheet resistance low enough to adequately dissipate the electrostatic charge.

5. The method of claim 3, further comprising the step of:
forming a passivation layer disposed over at least a portion of the dielectric layer.

6. The method of claim 5, wherein the passivation layer has an optimum thickness to prevent damage to the underlying conductive plates due to use and environment while also allowing an electrostatic charge to dissipate through the conductive grid.

7. The method of claim 5, wherein the discharge grid is integral with the passivation layer.

8. The method of claim 5, wherein the passivation layer comprises silicon carbide.

9. The method of claim 5, wherein the passivation layer comprises silicon nitride.

10. The method of claim 5, wherein the passivation layer has a thickness of between approximately 2,000 and 3,000 angstroms.

11. A portion of an integrated circuit having sensor cells, comprising:
a protective layer including an insulating layer between and over a plurality of conductive plates within an array of capacitive sensor cells operable to sense surface features on an object proximate to the conductive plates,
wherein the protective layer isolates the conductive plates and protects the conductive plates from damage, and
wherein the protective layer comprises a conductive discharge grid including lines extending along logical boundaries between adjoining capacitive sensor cells and separated by open regions in the conductive grid over at least portions of the conductive plates.

12. The integrated circuit of claim 11, wherein the protective layer further comprises a passivation layer to further protect the conductive plates from damage.

13. A portion of an integrated circuit, comprising:
a dielectric layer over a plurality of conductive plates within an array of capacitive sensor cells operable to sense surface features on an object proximate to the conductive plates, the dielectric layer isolating the conductive plates; and
a conductive grid disposed over at least a portion of the dielectric layer and including lines extending along logical boundaries between adjoining capacitive sensor pixels and separated by open regions in the conductive grid over at least portions of the conductive plates, wherein the conductive grid dissipates an electrostatic charge in a manner that prevents the electrostatic charge from reaching the plurality of conductive plates.

14. The integrated circuit of claim 13, further comprising:
a passivation layer disposed over at least a portion of the dielectric layer.

15. The integrated circuit of claim 13, wherein the discharge grid is planar with the passivation layer.

16. The integrated circuit of claim 13, wherein the discharge grid is planar with the passivation layer.

17. The integrated circuit of claim 13, wherein the discharge grid is under the passivation layer.

18. The integrated circuit of claim 13, wherein the discharge grid is adjacent the passivation layer.

19. The integrated circuit of claim 11, wherein the conductive grid is disposed over substantially all logical boundaries for capacitive sensor cells within the array, and wherein the conductive grid is disposed over substantially all of a gap between conductive plates within adjacent sensor cells.

20. The integrated circuit of claim 11, wherein the conductive grid is disposed over substantially all of logical boundaries for capacitive sensor cells within the array, and wherein the conductive grid is disposed over a portion of the conductive plates within each sensor cell.

21. The integrated circuit of claim 13, wherein the conductive grid is disposed over a portion of the dielectric layer adjacent to and surrounding the conductive plates, and wherein the passivation layer is disposed over the conductive grid.

22. The integrated circuit of claim 13, wherein the conductive grid is disposed over a portion of the dielectric layer adjacent to the conductive plates, and wherein the passivation layer is disposed adjacent the conductive grid and over the dielectric layer not covered by the conductive grid.

23. The integrated circuit of claim 13, wherein the conductive grid is disposed over a portion of the dielectric layer adjacent to the conductive plates, and wherein the conductive grid is disposed over the passivation layer.

24. The integrated circuit of claim 13, wherein the conductive grid and the passivation layer are substantially planar.

25. The integrated circuit of claim 13, wherein each capacitive sensor cell contains a pair of the conductive plates and wherein the conductive grid is only disposed over gaps between conductive plates.

26. A portion of an integrated circuit package having a sensor chip comprising:
a sensor chip having disposed thereon an array of sensor cells;
an insulating layer on the sensor circuitry, the insulating layer electrically isolating the sensor circuitry from subsequent layers;
a first group of substantially parallel electrically conductive lines on the insulating layer; and
a second group of substantially parallel electrically conductive lines disposed on the insulating layer substantially perpendicular to the first group of conductive lines, wherein the first and second groups of electrically conductive lines dissipate an electrostatic charge and protect the plurality of conductive plates.

27. The integrated circuit package of claim 26, wherein each of the first and second groups of conductive lines are grounded to an off-chip ground.

28. The integrated circuit package of claim 26, wherein the first and second groups of conductive lines form a discharge grid that has a sheet resistance low enough to adequately dissipate the electrostatic charge.

* * * * *